(12) United States Patent
Goodman et al.

(10) Patent No.: US 7,353,996 B2
(45) Date of Patent: Apr. 8, 2008

(54) DEVICE FOR STORING AND DISPLAYING SELECTED BAR CODES

(75) Inventors: Brian Gerard Goodman, Tucson, AZ (US); Diana Joyce Hellman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 11/116,790

(22) Filed: Apr. 28, 2005

(65) Prior Publication Data

US 2006/0243806 A1    Nov. 2, 2006

(51) Int. Cl.
*G06K 7/10* (2006.01)

(52) U.S. Cl. .............. 235/462.01; 235/436; 235/454; 235/462.08

(58) Field of Classification Search ............... 235/378, 235/462.01, 462.08, 462.07, 462.15, 436, 235/454
See application file for complete search history.

(56) References Cited

U.S. PATENT DOCUMENTS

| | | | |
|---|---|---|---|
| 4,443,027 A | 4/1984 | McNeely et al. ............. 283/83 |
| 5,192,947 A | 3/1993 | Neustein ................. 340/825.44 |
| 5,276,311 A | 1/1994 | Hennige ...................... 235/380 |
| 5,410,136 A | 4/1995 | McIntire et al. ............ 235/380 |
| 5,767,896 A | 6/1998 | Nemirofsky .................. 348/13 |
| 5,955,961 A | 9/1999 | Wallerstein ............ 340/825.33 |
| 6,167,251 A * | 12/2000 | Segal et al. .................. 455/406 |
| 6,473,072 B1 | 10/2002 | Comiskey et al. .......... 345/173 |
| 6,536,670 B1 * | 3/2003 | Postman et al. ............ 235/487 |
| 6,698,656 B2 * | 3/2004 | Parker et al. .......... 235/462.01 |
| 6,736,322 B2 * | 5/2004 | Gobburu et al. ....... 235/462.46 |
| 7,203,158 B2 * | 4/2007 | Oshima et al. ............. 370/208 |
| 7,209,733 B2 * | 4/2007 | Ortiz et al. .............. 455/414.1 |
| 2002/0023027 A1* | 2/2002 | Simonds ....................... 705/26 |
| 2003/0067427 A1 | 4/2003 | Comiskey et al. ............ 345/84 |
| 2003/0160912 A1 | 8/2003 | Stephenson ................. 349/86 |
| 2003/0233276 A1* | 12/2003 | Pearlman et al. ............. 705/14 |
| 2004/0020988 A1* | 2/2004 | Omori .................... 235/462.01 |
| 2005/0131761 A1* | 6/2005 | Trika et al. ................... 705/14 |

* cited by examiner

*Primary Examiner*—Seung Ho Lee
(74) *Attorney, Agent, or Firm*—Zilka-Kotab, PC (57) ABSTRACT

A device for storing and displaying numerous optically readable codes. The device includes a memory for storing the codes, a display for displaying the codes of sufficient contrast to be readable by an optical scanner, an optional selector for allowing the user to request display of the code(s), and a processor for coordinating operation of the memory, display and optional selector.

20 Claims, 6 Drawing Sheets

DEVICE FOR STORING AND DISPLAYING SELECTED BAR CODES

FIELD OF THE INVENTION

The present invention relates to display devices, and more particularly, this invention relates to a device that stores and displays bar codes and/or other optically-readable codes.

BACKGROUND OF THE INVENTION

Bar codes have been used in a variety of applications for over a quarter of a century. In its simplest form, a bar code is an array of bars and spaces that represent numbers, letters, or other symbols, though the definition of bar code has been expanded to encompass two dimensional arrays of bars, dots and spaces. A bar code reader is used to read the code. The reader uses a laser beam and detector that is sensitive to the reflections from the line and space thickness and variations. The reader translates the reflected light into digital data that is transferred to a computer for immediate action or storage. Alternatively, an LED (Light Emitting Diode) may be used instead of a laser, to illuminate the bar codes. Still further, line scanners, CCDs (Charge Coupled Devices), and cameras may be used to read or scan bar code labels. Bar codes and readers are most often seen in supermarkets and retail stores, but are also used to take inventory in retail stores; to check out books from a library; to track manufacturing and shipping movement; to sign in on a job; to identify hospital patients; and to tabulate the results of direct mail marketing returns.

A prevalent use of bar codes today is in the field of consumer tracking, such as in grocery stores, and unique member identification numbers for clubs such as health clubs, video store memberships, library memberships, and frequent-purchase clubs and programs. Accordingly, each of these locations provides the customer with an individualized bar code identification card, which the customer must have present in order to access the facility, participate in activities therein, or receive particular benefits. Every program in which the customer participates increases the number of cards that the individual must carry to ensure entry into the health club or discount warehouse, to be able to check out books or videos, and to be eligible for the lowest prices at the supermarket or frequent-purchase program (such as at a bike store or vitamin store).

Typical cards are either credit-card size or a small "keychain"-tag size. While such cards are small and thin, just a few of the cards greatly increases the bulk of a wallet or purse.

Carrying a multiplicity of cards also increases the amount of time the customer must spend at the check-out counter to find the correct card. Often these cards look similar, and time can be wasted if the customer presents the incorrect card. The customer may also be less inclined to join a frequent-purchase club or other type of club simply because they do not want to receive yet another membership card.

What is needed is a single, portable device capable of replacing the plurality of cards that must currently be carried by the user. To that end, what is needed is a device for storing and displaying the appropriate bar code information at any location of the customer's choosing.

SUMMARY OF THE INVENTION

The present description describes a device that can store numerous optically readable codes (e.g., bar codes) for many purposes such as customer identification at or for: grocery stores, health clubs, frequent-purchase programs (bike store, vitamin store), library cards, video-store memberships, etc. By having multiple codes stored on one single device, a user does not need to carry around many cards but need only carry the one device.

The device in one embodiment contains a memory for storing the codes, a display for displaying the codes in sufficient contrast to be readable by an optical scanner, a selector for allowing the user to request display of the code(s), and a processor for coordinating operation of the memory, display and selector.

The devices described herein have many permutations. One embodiment is not much larger than the keychain-tag size bar code tag, while another embodiment resembles a credit card. Other embodiments implement telephone and/or PDA (Personal Digital Assistant) functionality. Further embodiments display multiple codes simultaneously.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

Figure 1:
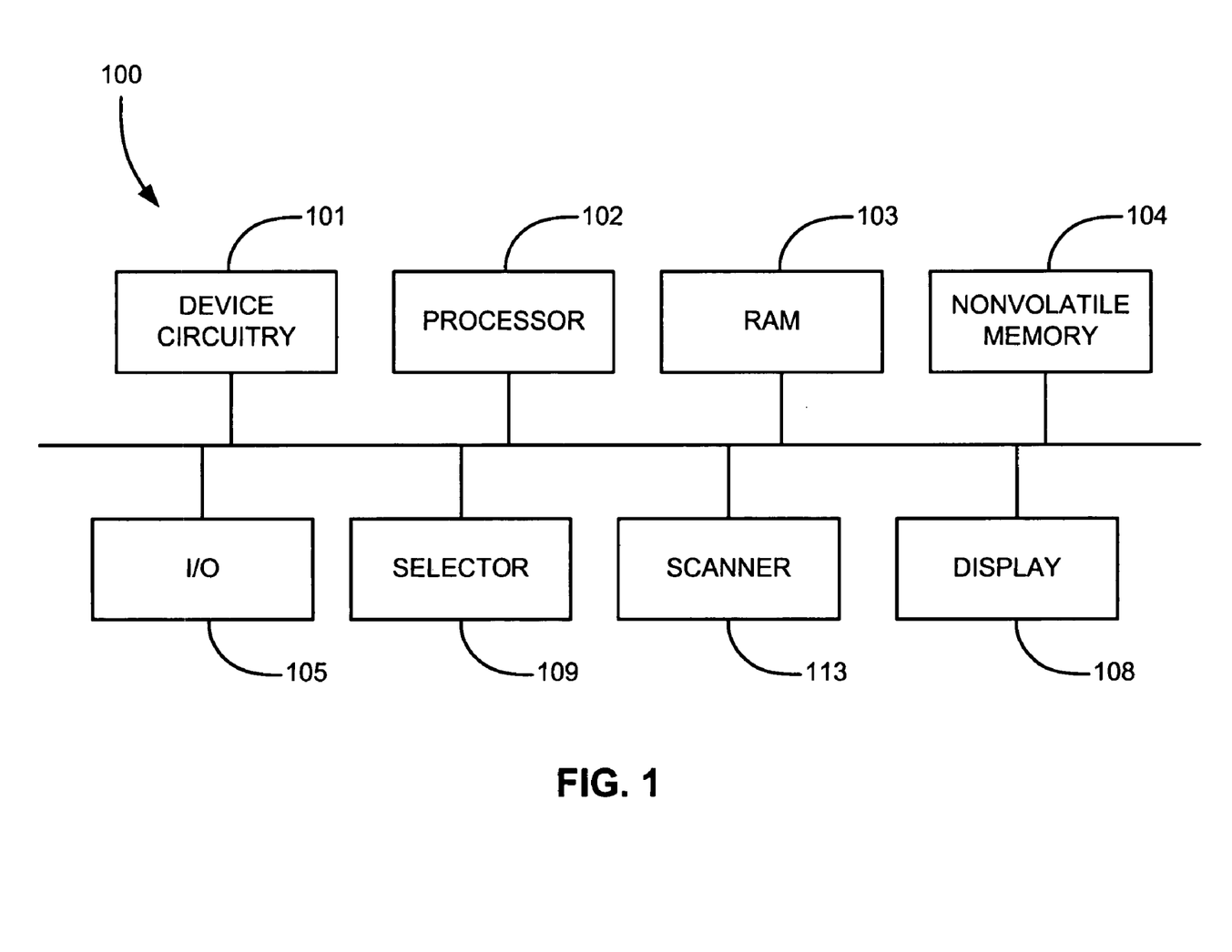
FIG. 1 is a simplified system diagram of a device for displaying optically readable codes according to one embodiment.

Referring to FIG. 1, there is depicted an example of a device 100 for storing and displaying optically readable codes. Optically readable codes as used herein are meant to encompass any code that is machine-readable via an optical scanner, including laser scanners and other scanners that use visible and/or invisible light to read a code. For simplicity, such optically readable codes are referred to herein generally in terms of bar codes, though it should be kept in mind that any code readable by an optical scanning machine falls within the present definition of optically readable codes. Table 1 summarizes the most common bar code standards, any of which may be implemented in the present invention.

TABLE 1

| Bar Code Standard | Typical Uses |
| --- | --- |
| Uniform Product Code (UPC) | Retail stores for sales checkout; inventory, etc. |
| Code 39 (Code 3 of 9) | Identification, inventory, and tracking shipments |
| POSTNET | Encoding zip codes on U.S. mail |
| European Article Number (EAN) | A superset of the UPC that allows extra digits for country identification |
| Japanese Article Number (JAN) | Similar to the EAN, used in Japan |
| Bookland | Based on ISBN numbers and used on book covers |
| ISSN bar code | Based on ISSN numbers, used on periodicals outside the U.S. |
| Code 128 | Used in preference to Code 39 because it is more compact |
| Interleaved 2 of 5 | Used in the shipping and warehouse industries |
| Codabar | Used by Federal Express, in libraries, and blood banks |
| MICR (Magnetic Ink Character Recognition) | A special font used for the numbers on the bottom of bank checks |
| OCR-A | The optical character recognition format used on book covers for the human readable version of the ISBN number |
| OCR-B | Used for the human readable version of the UPC, EAN, JAN, Bookland, and ISSN bar codes and for optional human-readable digits with Code 39 and Interleaved 2 of 5 symbols |
| Maxicode | Used by the United Parcel Service |
| PDF417 | A new 2-D type of bar code that can encode up to 1108 bytes of information; can become a compressed, portable data file (PDF) |

With continued reference to FIG. 1, the device is illustrated with a processor 102, optional RAM (Random Access Memory) 103, a read-only and/or rewritable nonvolatile memory 104, device specific circuits 101, and an I/O (Input/Output) interface 105, any or all of which may comprise "elements" of the device 100. The processor 102 may be an off-the-shelf microprocessor, custom processor, programmable logic, discrete logic, ASIC (Application Specific Integrated Circuit), etc., as are known to those of skill in the art.

The bar codes are preferably stored in the nonvolatile memory 104. This may comprise a graphic representation of the bar codes, such as an image or picture. In addition, it may comprise an encoded representation of the bar codes. In this case, the encoded bar code in nonvolatile memory 104 may be converted by the device 100 to a suitable format for output to the display 108. The nonvolatile memory 104 may also hold the executable computer readable program code of a computer program product, or the logic of a programmable logic device, which may also be called firmware, and any nonvolatile data for the computer processor 102, and may comprise a PROM (Programmable Read-Only Memory), flash PROM, EEPROM (Electrically Erasable PROM), MRAM (Magnetoresistive Random Access Memory), battery backup RAM (Random Access Memory), and other of many types of nonvolatile memory are also known to those of skill in the art. The processor 102 may alternatively maintain the executable computer readable program code in an internal memory. The nonvolatile memory 104 may also hold programmable firmware for a programmable logic processor 102.

An input/output interface 105 may be provided, and is some form of communication mechanism that allows the computer processor 102 to communicate with and/or receive information from the outside world. Examples may include, but without limitation, SCSI (Small Computer Systems Interface), Ethernet, Fibre Channel interfaces, CAN (Controller Area Network), RS-232 (Recommended Standard), I2C (Inter-IC), USB (Universal Serial Bus), FireWire, etc. In addition, wireless communication mechanisms may also be used such as infrared, magnetic, inductive, RF etc. Alternatively or additionally, the input/output interface may comprise an access port at which an authorized person or apparatus may connect to the electronic device.

The bar codes can be loaded into the system 100 through an input mechanism. In one example of an input mechanism, the bar codes are loaded into nonvolatile memory 104 via the input/output interface 105 and a connection to an external computing device, such as a PC (Personal Computer), PDA (Personal Digital Assistant), wireless telephone, bar code scanner, system of the entity issuing the code, etc. Enabling the device 100 to connect to an external computing device allows the user to easily store all of the information in case the actual device 100 is broken, lost, or experiences a memory loss.

In another example of an input mechanism, the input/output interface 105 may include a manual input mechanism such as a selector 109 (e.g., button(s), key(s), wheel, etc.) that receive user input. The bar codes can be loaded into the nonvolatile memory 104 via the selector 109. The user could enter the numerical equivalent of the bar code and device specific circuits 101 or software would convert the numerical equivalent into the appropriate bar code. This conversion could be done when the bar code numbers or letters are entered with the selector, or it could be done when the bar code is ready to be displayed on display 108.

The selector 109 may also function to allow the user to select one or more bar codes for output on a display 108. For instance, a button/key or wheel can allow the user to sequentially scroll through the codes stored in the nonvolatile memory 104. The selector 109 can also initiate a sequence in which all of the codes, or subset thereof, stored in the nonvolatile memory 104 are sequentially displayed one or more times. The selector 109 can even be as simple as an on/off button that starts the device 100 and begins cycling of the codes.

Alternatively or additionally, the input mechanism may comprise an optical scanner 113 that scans a bar code, which is then stored to nonvolatile memory 104. The optical scanner 113 can be external to the device 100 and connect thereto via a port, cable, or wirelessly. For example, the device 100 may be coupled to a personal computer through interface 105. The personal computer may comprise a bar code scanner and the scanner may be used to read bar code labels for transfer to device 100. The optical scanner 113 can also be built in to the device 100. For example, the device 100 may comprise an LED (Light Emitting Diode) and detector that may be used to read an existing bar code for storage into the nonvolatile memory 104. In addition, line scanners, cameras, and CCDs (Charge Coupled Devices) may also be used to read bar code labels. Still further, the device 100 may comprise a camera that takes a picture of the bar code label. The device 100 may interpret the picture to determine the equivalent bar code, or it may store the picture in nonvolatile memory 104. In the case of a stored picture, the device 100 may simply display the stored picture on display 108 when a user eventually selects the code for display. As described above, a number of devices and techniques may be used to capture or identify a representation of the bar code. Herein, any device that is used to read, photograph, copy, decode, or interpret a bar code, can be referred to and considered to be a scanner, optical scanner, and/or bar code scanner.

In any of the above-mentioned input schemes, other identification data may also be input to indicate which bar code is associated with which business or club. In a preferred embodiment, words can be associated with the codes. For example, the user can enter the bar code and word on his or her PC and download that information to the device 100, or scan the bar code information on the user's membership cards, credit cards or other similar type cards. One skilled in the art will appreciate the many combinations of actions that would achieve the same result.

It should also be mentioned that bar codes may temporarily be stored in RAM 103 or even not stored in memory but displayed on the display for a period of time or until the display is changed. For example, if the user is given a temporary membership to a club or gym, the bar code need only be stored for so long as needed, e.g., for the day. In another example, multiple bar codes may be displayed at the same time. In this case, there may not be a need for a selector or any kind of internal power source. To conserve storage space in the nonvolatile memory 104, the bar code can be stored in RAM 103 and/or displayed on a persistent display (described below) for as long as the code is useful or active, until the RAM is rewritten, or until the display is changed.

The optional device specific circuits 101 provide additional hardware to enable the device 100 to perform specific functions such as display bar codes, etc. For example, the device specific circuits 101 may comprise electronics that provide a display controller, etc. In another example, the device specific circuits 101 may comprise electronics that provide the ability to scan a bar code or take a picture of a bar code.

Any of the elements of FIG. 1 may be combined into one or more components, for example, the nonvolatile memory 104, RAM 103, and/or I/O interface 105 may comprise components of the processor 102.

In accordance with the present invention, the device 100 is provided with a display 108 for displaying the bar codes in sufficient contrast to be detectable by an optical scanner such as a laser scanner. Because the bar codes need only be displayed when the user presents the device, the display can be activated upon user-actuation of an input mechanism (selector, button(s), key(s), wheel, on/off switch, etc.). Essentially, the device 100 wakes from an "off" state or a low power "sleep" mode entered into after a short period of time has elapsed.

The electronic display 108 can be an LCD (Liquid Crystal Display), LED (Light Emitting Diode) display, or equivalent, as understood by those of skill in the art. Examples of power sources for such displays (and overall system) may comprise a battery, a capacitor, electrical connection, electromagnetic induction, light, RF energy, etc., as is understood by those of skill in the art. The display comprises at least one electronic module for operating the display 108. The electronic module comprises an input for providing a signal for updating the display 108. For powered displays, a power element can be provided to update and maintain the display.

The display 108 is preferably an electronic persistent visual display mounted to the device 100. The persistent visual display is defined as providing a visual display which persists indefinitely, even if any input signal is removed. Thus, an input signal may update the display, and the updated display will persist after the input signal is removed. An electronic persistent visual display 108 has a stable image "memory effect" for an extended period of time. An example of an electronic persistent visual display which has a persistent display in the absence of power is an electronic ink, or "E Ink", electronic display which is available from E Ink Corporation, 733 Concord Ave., Cambridge, Mass. 02138 (www.eink.com).

Figure 2:
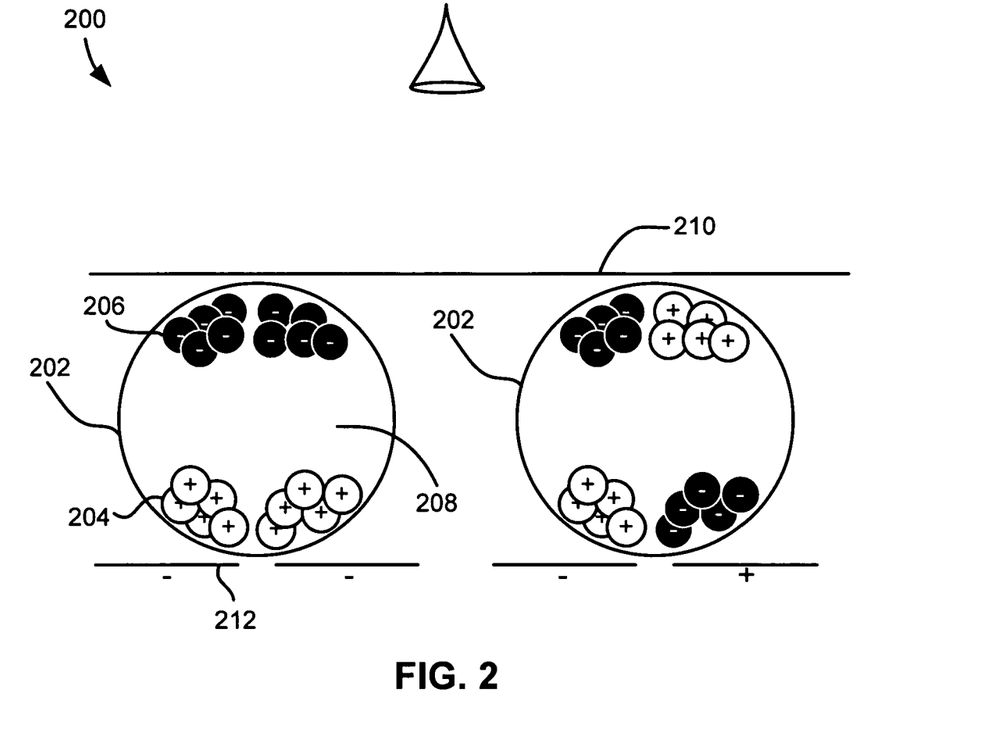
FIG. 2 is a partial cross sectional display of an electronic ink display.

Electronic ink is a material that is processed into a film for integration into electronic displays. The principal components of electronic ink are millions of tiny microcapsules, about the diameter of a human hair. FIG. 2 depicts a portion of an illustrative electronic ink display 200 according to one embodiment. As shown, each microcapsule 202 contains positively charged white particles 204 and negatively charged black particles 206 suspended in a clear fluid 208. When a negative electric field is applied to a top (outer) substantially transparent electrode 210, the white particles 204 move to the top of the microcapsule 202 where they become visible to the user. This makes the surface appear white at that spot. At the same time, an opposite electric field at a bottom electrode 212 pulls the black particles 206 to the bottom of the microcapsules 202 where they are hidden. By reversing this process, the black particles 206 appear at the top of the microcapsule 202, which now makes the surface appear dark at that spot. Note that subcapsule addressing, as shown in the microcapsule 202 on the right side of FIG. 2, enables high resolution display capabilities.

To form an electronic ink display 200, the ink is printed onto a sheet of plastic film that is laminated to a layer of circuitry including the electrodes 210. The circuitry forms a pattern of pixels that can then be controlled by a display driver. These microcapsules are suspended in a liquid "carrier medium" allowing them to be printed using existing screen printing processes onto virtually any surface, including glass, plastic, fabric and even paper.

The use of electronic ink is preferred due to its high contrast ratio and low power consumption. Electronic ink has a much higher contrast ratio than LCD displays. Further, electronic ink displays are completely reflective requiring no backlight, and they have an inherently image stable "memory effect" for extended periods of time requiring no power between image states. Once an image is written on an electronic ink display, it will be retained without additional power input until the next image is written. Hence the power consumption of an electronic ink display will ultimately depend upon the frequency at which the displayed image is changed and not how long a display is read.

With continued reference to FIG. 1, the processor 102 coordinates operation of the memory 103, 104, display 108, input/output interface 105, and may operate the operational element 101. The processor, in response to a request to display one or more bar codes, provides an update input signal at the display input of FIG. 1. The update input signal comprises information selected from the information regarding the electronic device stored in the nonvolatile memory 104, and/or stored by the processor 102. The update signal updates the output of the display 108. Thus, the requirement of having individual cards for each bar code is avoided.

Figure 3A:
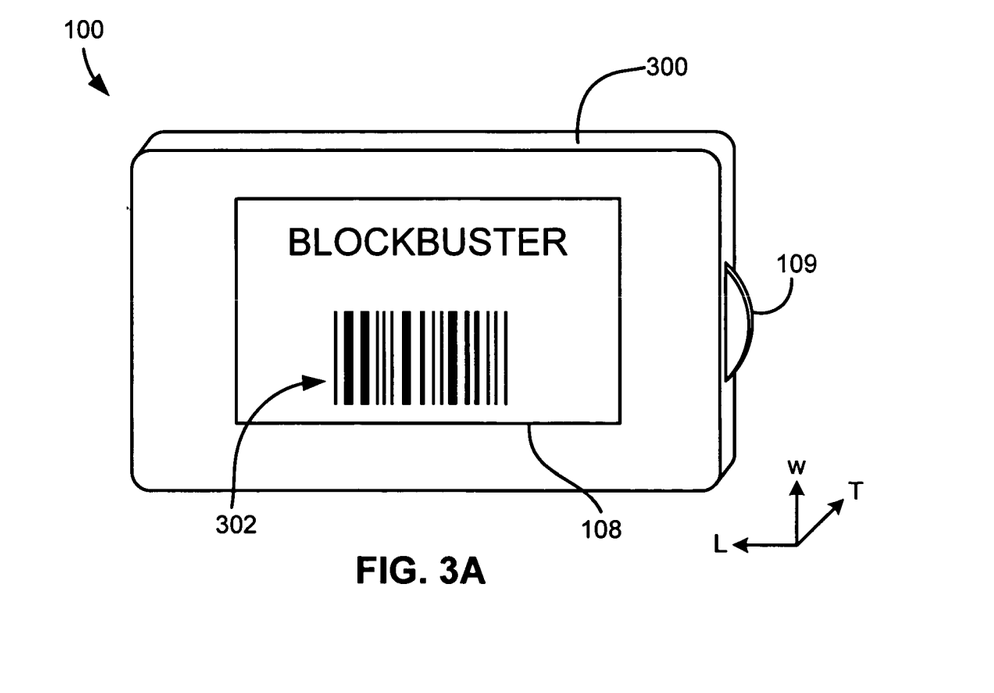
FIGS. 3A-B are perspective views of a device for displaying optically readable codes, the device having dimensions similar to a standard credit card.
Figure 3B:
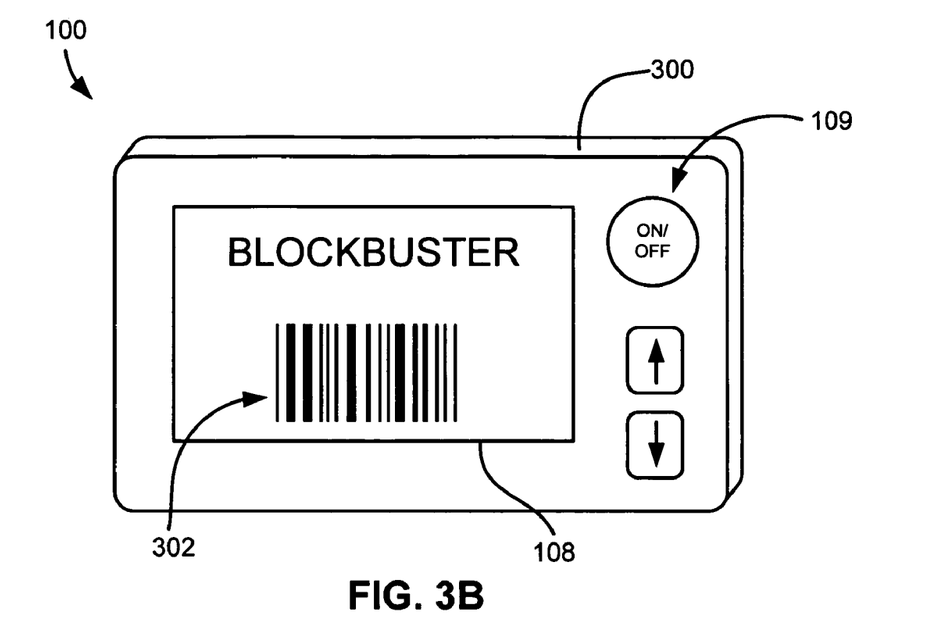

The elements of the device 100 are preferably coupled to a housing. FIGS. 3A-B depicts illustrative devices 100 having a compact housing 300. In these embodiments, the devices 100 are about the size of a standard credit card, e.g., having dimensions of less than about 3.50 inches long (L) by less than about 2.50 inches wide (W) by less than about 0.250 inches thick (T) (though the thickness is preferably smaller than 0.125 inches). These embodiments could be placed in the user's wallet or purse along with credit cards, etc. And because electronic ink displays are durable and flexible, slight bending of the devices 100 will not cause any damage to the devices 100.

The device 100 of FIG. 3A is shown with a large display 108 and a wheel type selector 109. A wheel type selector 109 may be preferred in certain embodiments, as it is less likely to be actuated unintentionally in a wallet or purse, as compared to buttons. However, to minimize costs, key type selectors 109 can be used alternatively, as shown in FIG. 3B. Or a combination of keys and wheel can be used.

In use, the user actuates the selector 109 (rolls the wheel or presses the keys) to sequentially scroll through the bar codes stored in memory. When the desired bar code 302 is displayed, in this case, the bar code associated with the user's BLOCKBUSTER® account, the user, or other person, then positions the display 108 over an optical scanner. The optical scanner reads the bar code 302 from the display 108 as if the device were the original membership card issued by Blockbuster.

Figure 4:
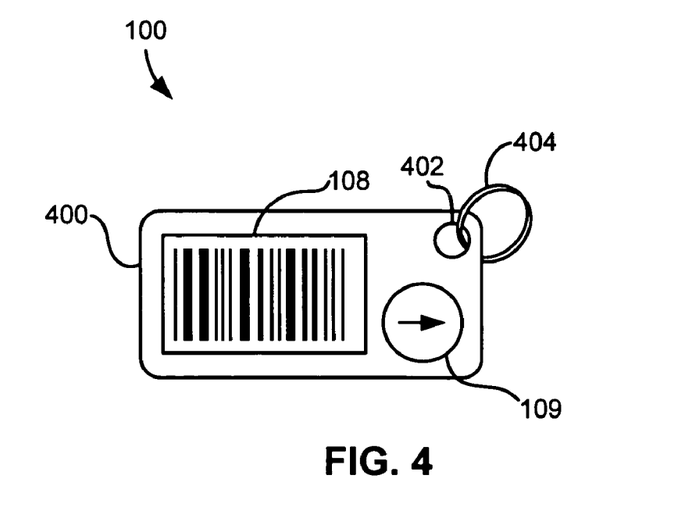
FIG. 4 is a side view of a device for displaying optically readable codes, the device having dimensions similar to a keychain-size bar code tag.

FIG. 4 depicts a device 100 which has dimensions similar to a keychain-size bar code tag, e.g., less than about 2.25 inches long by less than about 1.00 inch wide by less than about 0.250 inches thick (though the thickness is preferably smaller than 0.125 inches). This embodiment features an aperture 402 through the housing 400 for receiving a key ring 404 or keychain. The selector 109 in this exemplary embodiment is a button that, upon each actuation, displays one of the stored bar codes. The selector 109 can also be programmed to sequentially cycle through all of the codes stored in memory upon actuation. The likelihood of each of the issuing entities (grocery store, vitamin club, etc.) using identical-length bar codes and/or identical account names and numbers for personal identification is low, so automatically cycling through the bar codes would simplify functionality.

Figure 5:
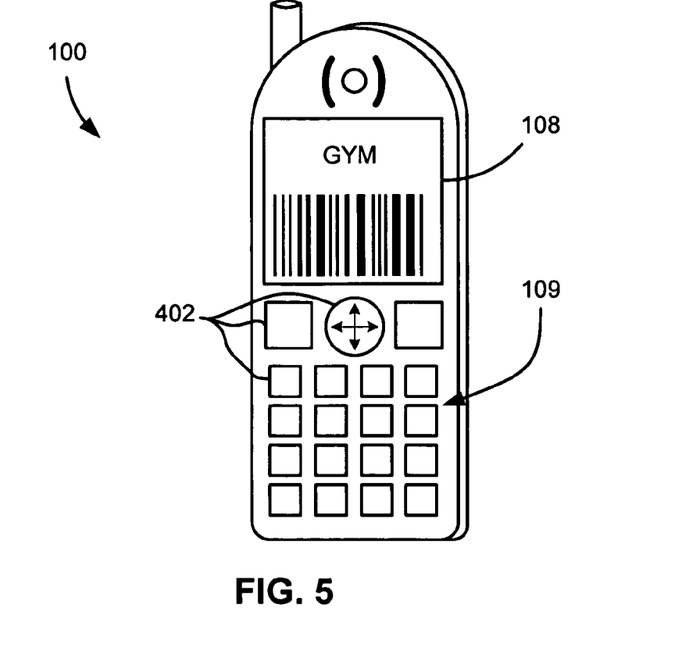
FIG. 5 is a perspective view of a device for displaying optically readable codes embodied in a wireless telephone.

FIG. 5 depicts a variation in which the device 100 is embodied in a wireless telephone. One skilled in the art will appreciate how a wireless telephone functions and is constructed.

In the embodiment of FIG. 5, the selector 109 includes the keys 402. One skilled in the art will appreciate the many variations of keystrokes that can be used to retrieve the bar codes. For instance, pressing an up key or down key can allow the user to scroll through the stored bar codes in the form of a memory catalog (like the catalog of phone numbers for a wireless phone), The various stored bar codes can also be associated with the numbers on the keys, such that pressing "*" then "1" retrieves the bar code in memory position 1, etc.

To store a bar code in memory, a camera (not shown) and software, firmware or logic in the phone can function as an optical scanner that can image a bar code from a card or sticker issued to the user by an entity. An image of the bar code can then be retrieved, or the software/firmware/logic can reproduce the bar code to make it easier to read when displayed. The user can also key in the numerical equivalent of the bar code using the keys 402.

Figure 6:
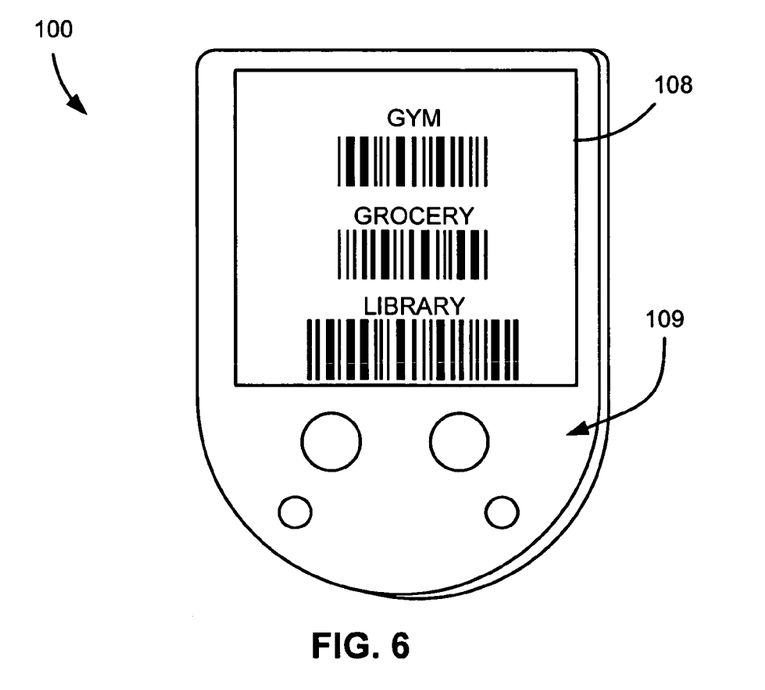
FIG. 6 is a perspective view of a device for displaying optically readable codes embodied in a PDA.

FIG. 6 depicts yet another variation in which the device 100 is embodied in a PDA. One skilled in the art will appreciate how a PDA functions and is constructed. In use, the PDA can function in a manner similar to the embodiments above, with the additional benefit that the PDA is much simpler to connect to an external computing device to download bar codes, as most PDAs already have enabling connectivity software present. Further, PDAs often have a combination of keys and touch screen for input. Accordingly, either or both of these can be used as the selector 109.

In addition, the larger screen allows multiple bar codes to be displayed simultaneously. This can significantly increase the speed at which the user or device can order output of the appropriate bar code. It is possible that all of the user's bar codes can be displayed in one or two screens. The user would then not need to search out the proper bar code for the current location, but rather swipe each page of code in front of the optical scanner.

Figure 7A:
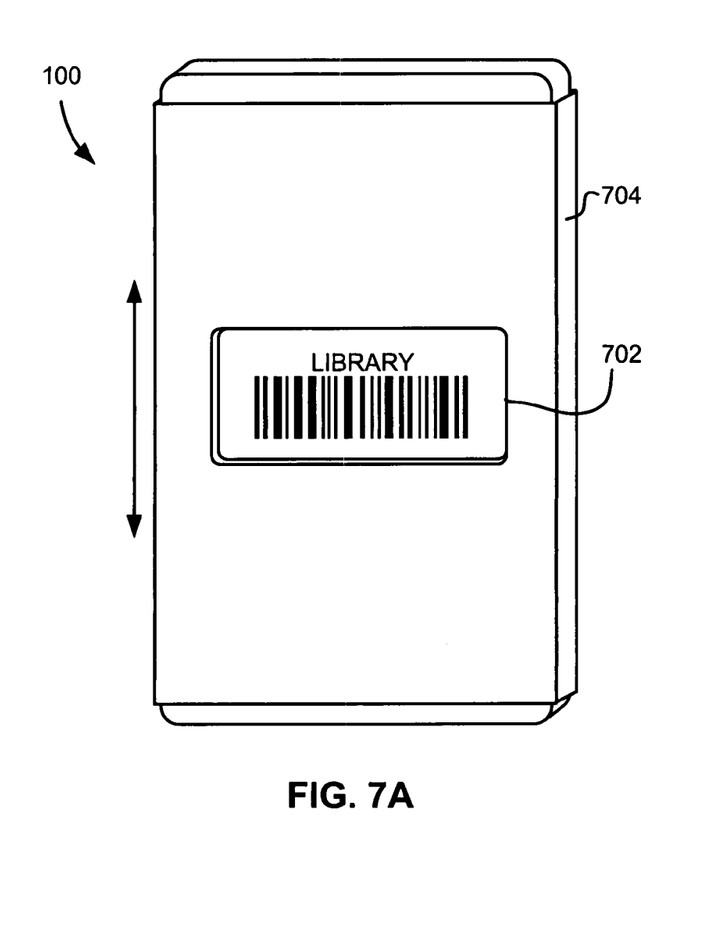
FIGS. 7A-B are perspective views of a device for displaying multiple optically readable codes, where the code is displayed through an aperture.
Figure 7B:
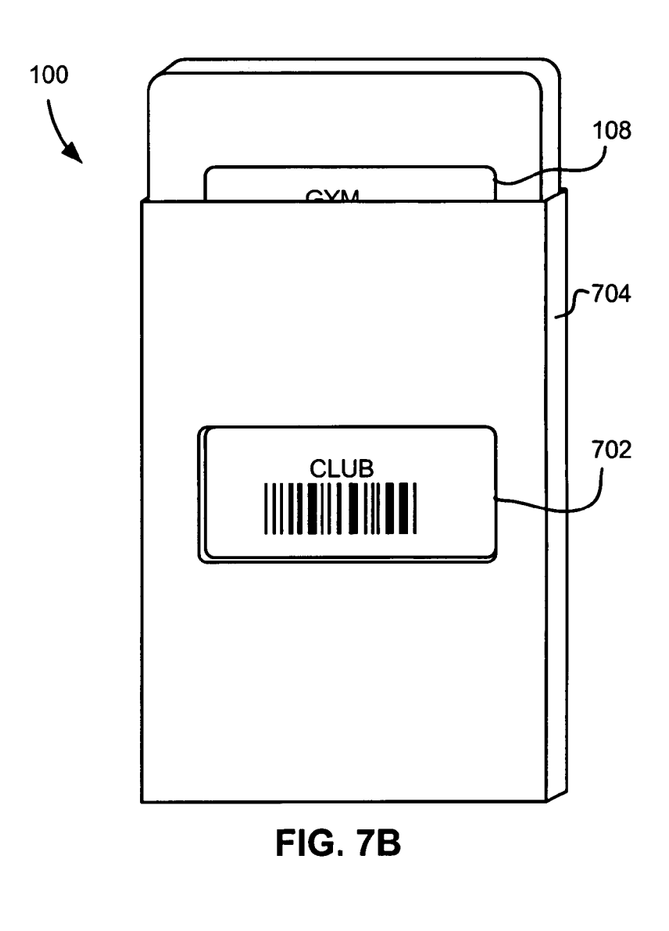

In another embodiment, depicted in FIGS. 7A-B, the device 100 may be used to display multiple bar codes at once. In this embodiment, there may not be a need for a selector 109 if all of the desired codes can be displayed at the same time. In order to avoid interference or confusion for the scanner 802, from multiple unrelated bar codes, a physical aperture 702 could be used to mask or hide unwanted bar codes. For example, the device 100 could be placed in a sleeve 704 that contains an aperture 702, e.g., a hole or cutout, that a user could slide back and forth to expose certain bar codes through the aperture. Note that the aperture could include a substantially transparent insert, overlay or underlay e.g., of plastic, if desired. If a persistent display is used with this embodiment, there may not be a need for any memory 103, 104. This is because the persistent display could be used to hold an image of all of the desired bar codes, thus eliminating the need for any memory for storing the codes. In addition, there may not be a need for a processor 102. This is because the display could be updated through an external interface, such as I/O 105. Still further, the need for a power source could also be eliminated from device 100 because the display would only need power for updating. The power for display update could be obtained from I/O 105, through other connections or contacts on the device 100, through inductive means such as electromagnetic induction, through optical means such as photo cells, etc., or any other means for supplying power as is known to those of skill in the art.

Additional embodiments contemplated include implementation in other memory devices having a display. For instance, audio playback devices such as USB-connectable MP3 players also have a display, and can be readily adapted to display bar codes.

Figure 8:
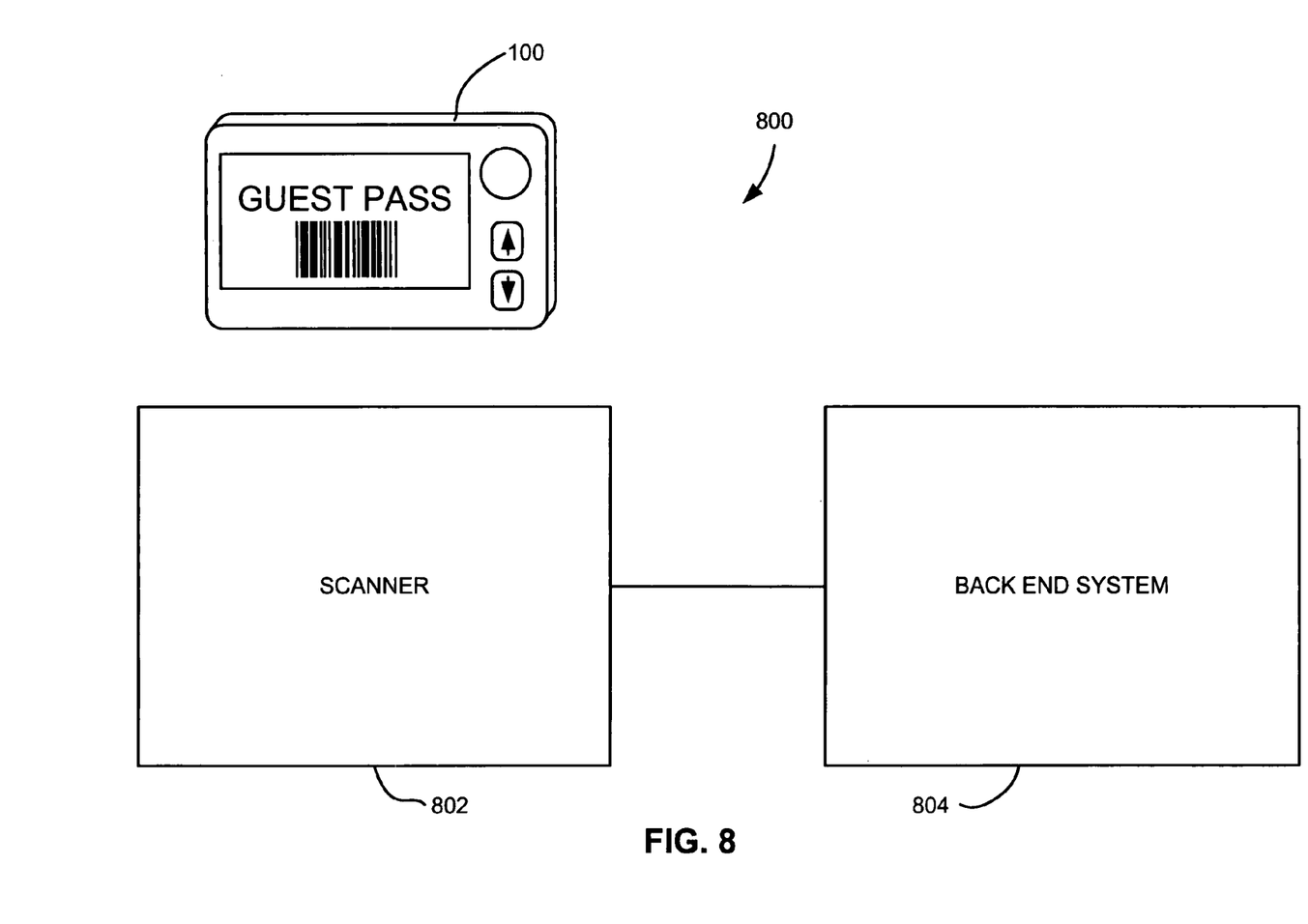
FIG. 8 is a simplified system diagram of a system implementing a device for displaying optically readable codes and an optical scanner.

FIG. 8 depicts a system 800 implementing the code-storing device 100 described above and an optical scanner 802 physically present at a location such as a store, club, gym, library, etc. or at an entity requiring registration for entry or participation in an activity or loyalty program, the displayed code identifying a holder of the device as being registered. An example of entry or participation in an activity or loyalty program may include a business that provides monetary savings on certain goods or services if proof of participation is provided. Another example may be credits, points, or savings each time a card is used or purchase is made. Still further, an example may comprise the requirement to provide proof of participation before services will be rendered. An entity requiring registration for entry or participation in any program is herein includes businesses, non-profits entities, government organizations, clubs, etc. In addition, registration may refer to the issuance of a card containing bar code information, and entry or participation may refer to the use of the card for any purpose.

When pertinent, the user instructs the device 100 to display the appropriate bar code, scroll through the codes, etc. The user then positions the device display 108 towards the optical scanner 802, which reads the displayed code(s) via a laser, etc. Upon reading each code, the backend system 804 connected to the optical scanner 802 attempts to match the code to a code stored in a database, and if a match is found, takes further action such as indicating that a match has been found, providing discounts, saving transactional information to a user's account, etc. Note that the optical scanner 802 can be physically attached to the backend system 804 (as is typical in retail store settings) or separate and portable, in which case the scanner 802 stores the data until it can be fed into the backend system 804.

There has thus been described a single item that can store numerous bar codes for many purposes, such as customer identification at or for: grocery stores, health clubs, frequent-purchase programs (bike store, vitamin store), library cards, video-store memberships, etc. By having multiple bar codes stored on one single device, a user does not need to carry around many annoying cards but need only remember the one item, possibly already on their key chain.

In the future, this type of device could even be used to track purchases electronically and build up a tab for the amount of money to be automatically withdrawn from a designated account. If this is implemented, a locking mechanism (electronic and/or physical) would be recommended.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A device for displaying optically readable codes, comprising:
    a housing;
    a memory coupled to the housing for storing multiple codes;
    a display coupled to the housing for displaying at least one of the codes in the memory, the at least one displayed code being readable by an optical scanner, wherein the display is a persistent visual display;
    a selector coupled to the housing for allowing a user to select the at least one code for output on the display;
    a processor coupled to the housing for coordinating operation of the memory, display and selector,
    wherein the memory, display and selector are coupled to a housing, wherein the housing has dimensions of less than about 3.50 inches by less than about 2.50 inches by less than about 0.250 inch.

2. The device according to claim 1, wherein the codes include bar codes.

3. The device according to claim 1, wherein the device does not have wireless communications capability.

4. The device according to claim 1, wherein actuation of the selector causes all of the codes stored in the memory to be automatically displayed on the display in a sequential manner.

5. The device according to claim 1, wherein the display for displaying the at least one code is at least one of a particle-based display media and a liquid crystal display (LCD).

6. The device according to claim 1, further comprising an input mechanism for receiving input of codes for storage in the memory.

7. The device according to claim 6, wherein the input mechanism receives user input of a sequence comprising at least one of numbers, letters and symbols, wherein the sequence is converted to a code being readable by an optical scanner.

8. The device according to claim 6, wherein the input mechanism connects directly to an external computing device.

9. The device according to claim 6, wherein the input mechanism is at least one of an optical scanner and an optical camera.

10. The device according to claim 9, wherein the at least one of the codes is a photographic image.

11. The device according to claim 1, wherein the persistent visual display comprises electronic ink.

12. The device according to claim 1, wherein the housing includes an aperture for receiving a key ring or key chain.

13. The device according to claim 1, wherein the device also functions as a personal digital assistant (PDA).

14. The device according to claim 1, wherein the device has no other functionality than receiving, storing, allowing selection of the codes, and outputting the codes.

15. A system utilizing optically readable codes, comprising:
    a device comprising:
        a housing;
        a memory for storing multiple optically readable codes;
        a display coupled to the housing for displaying a plurality of the optically readable codes;
        a moveable portion moveable along the display, the moveable portion having an aperture therein, the aperture having dimensions that allows one optically readable code displayed on the display to be viewable therethrough and another displayed code being blocked by the moveable portion,
        wherein the device is capable of displaying multiple codes simultaneously.

16. The system according to claim 15, further comprising an optical scanner physically integrated with a housing of the device, the optical scanner being for reading at least one optically readable code for storage on the device and output on the display, a second optical scanner physically present at an entity requiring registration for entry or participation, the displayed code identifying a holder of the device as being registered, the second optical scanner being for reading an optical code being displayed by the display of the device.

17. The system according to claim 15, further comprising an input mechanism coupled to the housing of the device for receiving user input of a sequence comprising at least one of numbers, letters and symbols, wherein the sequence is converted to a code being readable by an optical scanner.

18. A method for displaying optically readable codes, comprising:
    on a device comprising:
        a housing;
        a memory coupled to the housing for storing multiple codes;
        a display coupled to the housing for displaying at least one of the codes in the memory, the at least one displayed code being readable by an optical scanner;
        a selector coupled to the housing for allowing a user to select the at least one code for output on the display;
        an input mechanism for receiving input of codes for storage in the memory; and
        a processor coupled to the housing for coordinating operation of the memory, display and selector,
        wherein the display is a persistent visual display;
    receiving a code comprising at least one of numbers, letters and symbols via user input on an integrated input device;
    converting the code comprising at least one of numbers, letters and symbols to an optically readable code;

storing at least one of the code comprising at least one of numbers, letters and symbols and the optically readable code in an integrated memory;

receiving a request to display the optically readable code; and instructing an integrated display to output the optically readable code.

19. The method according to claim 18, further comprising displaying words each associated with one of a plurality of optically readable codes, receiving a selection of one of the words, and displaying the optically readable code associated with the word.

20. The method according to claim 18, wherein multiple optically readable codes are simultaneously output on the display, wherein the device further comprises a moveable portion moveable along the display, the moveable portion having an aperture therein, the aperture having dimensions that allows one optically readable code displayed on the display to be viewable therethrough and another displayed code being blocked by the moveable portion.

* * * * *